(12) United States Patent
Marcet et al.

(10) Patent No.: US 10,913,229 B2
(45) Date of Patent: Feb. 9, 2021

(54) METHOD AND INSTALLATION FOR WINDING A RUBBER STRIP ONTO A FORM OF REVOLUTION

(71) Applicant: COMPAGNIE GENERALE DES ETABLISSEMENTS MICHELIN, Clermont-Ferrand (FR)

(72) Inventors: Grégory Marcet, Clermont-Ferrand (FR); Thierry Ducros, Clermont-Ferrand (FR); Stéphane Ravat, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 205 days.

(21) Appl. No.: 15/778,320

(22) PCT Filed: Dec. 13, 2016

(86) PCT No.: PCT/FR2016/053350
§ 371 (c)(1),
(2) Date: May 23, 2018

(87) PCT Pub. No.: WO2017/103416
PCT Pub. Date: Jun. 22, 2017

(65) Prior Publication Data
US 2018/0345612 A1    Dec. 6, 2018

(30) Foreign Application Priority Data
Dec. 18, 2015   (FR) ...................................... 15 62803

(51) Int. Cl.
*B29D 30/30*   (2006.01)
*B29D 30/44*   (2006.01)

(52) U.S. Cl.
CPC .. *B29D 30/3007* (2013.01); *B29D 2030/4456* (2013.01)

(58) Field of Classification Search
CPC ........ B29D 30/3007; B29D 2030/4456; B29D 30/44
See application file for complete search history.

(56) References Cited

U.S. PATENT DOCUMENTS 2,354,120 A * 7/1944 Haren .................... B29D 30/38
156/361
3,779,834 A * 12/1973 Appleby ............ B29D 30/3007
156/406.4
(Continued)

FOREIGN PATENT DOCUMENTS

JP    2003-011245 A    1/2003
JP     2003011245 A *   1/2003

OTHER PUBLICATIONS

International Search Report issued by WIPO dated Mar. 14, 2017, in connection with International Application No. PCT/FR2016/053350 (in English).

(Continued)

*Primary Examiner* — Michael N Orlando
*Assistant Examiner* — Christopher W Raimund
(74) *Attorney, Agent, or Firm* — Venable LLP

(57) ABSTRACT

A method for winding a rubber strip onto a form of revolution includes steps of: forming a strip of predetermined length, applying front and rear edge marks to the strip, driving the strip towards the form, arranging a front edge of the strip on the form, and driving the form to wind the strip onto the form. In a first phase, the driving of the strip and the driving of the form are synchronized so as not to modify the length of the strip. In a second phase, the driving of the strip and the driving of the form are controlled depending on an angular position of the form and on a position of the rear (Continued)

edge mark, in order to vary relatively a displacement speed of the rear edge mark and a displacement speed of the front edge mark, to compensate for variations in the length of the strip.

12 Claims, 4 Drawing Sheets

(56) References Cited

U.S. PATENT DOCUMENTS

| | | | | |
|---|---|---|---|---|
| 4,474,338 | A * | 10/1984 | Hirano | B29D 30/3007 |
| | | | | 156/123 |
| 4,902,372 | A * | 2/1990 | Mick, Jr. | B29D 30/0681 |
| | | | | 156/361 |
| 5,175,930 | A * | 1/1993 | Okuyama | B29D 30/3007 |
| | | | | 156/403 |
| 5,292,398 | A * | 3/1994 | Miyamoto | B29D 30/58 |
| | | | | 156/130 |
| 5,582,664 | A * | 12/1996 | Sergel | B29D 30/3007 |
| | | | | 156/130 |
| 9,701,079 | B2 | 7/2017 | Ducros et al. | B29D 30/0061 |
| 2001/0008162 | A1 | 7/2001 | Shimizu et al. | 156/117 |
| 2011/0186198 | A1 | 8/2011 | Cerny | 152/209.6 |
| 2012/0111473 | A1 | 5/2012 | Hasegawa | 156/64 |

OTHER PUBLICATIONS

Written Opinion published by WIPO dated Jun. 22, 2017, in connection with International Application No. PCT/FR2016/053350 (in French; presently no English translation is available).

* cited by examiner

METHOD AND INSTALLATION FOR WINDING A RUBBER STRIP ONTO A FORM OF REVOLUTION

The invention relates to the field of tire manufacture.

It relates more particularly to a method and an installation for winding a strip of rubber onto a form of revolution, this strip of rubber being in particular intended to serve as a tread to be placed on a tire blank.

In a conventional method for winding a strip of rubber onto a form of revolution, a strip of predetermined length is formed which is driven towards the form longitudinally, and the first end of the strip, known as the front edge, is then arranged on the form before the form is driven so as to wind the strip onto the form.

Once the whole strip has been wound onto the form, the front edge is welded to the other end of the strip, known as the rear edge. Before undertaking the winding, the strip is usually cut beforehand diagonally so as to increase the contact surface area between the front and rear edges of the strip and thus to obtain a stronger weld.

It is indeed important, once the strip of rubber has been wound around the tyre blank, for the weld between the front and rear edges of the strip to lie within predefined tolerances as otherwise the ultimate performance of the tyre will be affected as a result. In particular, an open joint, an overlapping one, or alternatively one with a difference in thickness between the edges is not considered to be acceptable.

It is therefore desirable to ensure that, once the strip has been wound onto the form, the front and rear edges of the strip assume predetermined positions which make it possible to ensure an acceptable weld.

However, since the strip is made from rubber which is a material which flows easily and which in particular contracts after it has been cut, it has been observed that the length of the strip changes during the period of time between when it is cut and when it is placed on the form.

Consequently, once the strip has been wound around the form, it can be seen that the front and rear edges are not in the desired positions once the strip has been wound onto the form.

A method for winding a strip of rubber according to that described above, in which additionally marks are placed on either side of the cut line of the strip in order to identify the front and rear edge, is known from the document JP 2003 011245. These marks serve to determine if the weld is acceptable once the strip has been wound onto the form.

However, such a method only makes it possible to determine if a good-quality strip is obtained or not but does not make it possible to overcome the abovementioned problem and to obtain an acceptable weld after each winding operation.

BRIEF DESCRIPTION OF EMBODIMENTS OF THE INVENTION

The object of the invention is therefore to limit the flow effects of the strip of rubber when it is wound onto the form of revolution and to prevent faults occurring at the weld of the front edge and the rear edge, or at least that any faults lie within predefined tolerances.

To this end, the invention relates to a method for winding a strip of rubber onto a form of revolution, in which:
a strip of predetermined length is formed,
a first mark, known as the front edge mark, is placed on a first end of the strip, and a second mark, known as the rear edge mark, is placed on a second end of the strip,
the strip is driven longitudinally towards the form,
the first end is arranged on the form,
the form is driven so as to wind the strip onto the form,
characterized in that
in a first step, the driving of the strip and the form is synchronized such that the speed of displacement of the rear edge mark and the front edge mark are substantially identical so as not to modify the length of the strip,
in a second step, the driving of the strip and the form is controlled depending on the angular position of the form at the end of the first step and on the position of the rear edge mark such that the speed of displacement of the rear edge mark and the front edge mark vary relative to each other so as to compensate the variations in the length of the strip.

By virtue of the second step during which the speed of displacement of the position of the rear edge mark is varied relative to that of the front mark, the variation in length of the strip which has taken place between the time when it is cut and the time when it is placed on the form is compensated by stretching it or by causing it to contract.

It is preferably desirable to ensure that, at the end of this second step, the remaining length of the strip to be applied corresponds to the length of the neutral fiber of the strip referenced on the form so as to eliminate residual strain before the application is complete.

The front and rear edges of the strip are thus situated in the desired positions once the strip has been wound onto the form, which prevents them from being too spaced apart, from overlapping, or alternatively from there being a difference in thickness between the edges.

The rear and front edges can thus be welded with a good-quality weld each time a winding operation takes place.

According to a particular embodiment of the invention,
the strip is formed by cutting a continuous web of rubber so as to form successive upstream and downstream strips, and
the upstream end of the downstream strip and the downstream end of the upstream strip are marked simultaneously so that the mark applied to the upstream end of the downstream strip corresponds to the rear edge mark of the downstream strip, and that the mark applied to the downstream end of the upstream strip corresponds to the front edge mark of the upstream strip.

This makes it possible to repeat the mark operation simply and quickly.

According to a particular embodiment of the invention, with the first end of the strip arranged on a first predetermined position of the form, known as the reference position, the end of the first step is determined by detecting the front edge mark at a second predetermined position on the form, known as the detection position.

The detection position and the reference position are preferably separated on the form by a predetermined angle A of between 10° and 90°.

The choice of this angular range makes it possible to ensure that, at the end of the first step, the strip of rubber adheres well to the form of revolution and is unlikely to become unstuck during the second step.

In order to synchronize the driving of the strip and the form, which makes it possible to ensure that the length of the strip does not vary during the first step, where:
N is a predetermined angular rotational speed of the form,
$E_1$ is the length of the strip between the rear edge and front edge marks, and D is the angle of the sector, extending between the rear edge mark and the front edge mark, which it is desired to obtain once the whole strip has been wound onto the form, the speed $V_1$ of displacement of the rear edge mark during the first step is determined by the following equation:

$$V_1 = N^* E_1/(360-D).$$

Preferably, with the first end of the strip arranged on a first predetermined position of the form, known as the reference position, the end of the second step corresponds to the point in time at which the form has traveled through a predetermined additional angular sector B and still needs to travel through a predetermined additional angular sector C before returning to the reference position.

The angle B preferably lies between 90° and 260°.

The choice of this angular range makes it possible to ensure that the sector corresponding to the duration of the second step is sufficiently large to enable the variation in length of the strip to be corrected during the second step by the strip contracting or being lengthened.

The angle C preferably lies between 90° and 180°.

The choice of this angular range makes it possible to ensure that, at the end of the second step, the sector corresponding to the length of the remaining part of the strip to be wound around the form is sufficiently large to enable the residual strain in the strip to be eliminated before the end of the winding operation.

In order to vary the speed of displacement of the front edge mark relative to the speed of displacement of the rear edge mark so as to compensate effectively the variations in length of the strip during the second step, where:

N is a predetermined angular rotational speed of the form, $E_2$ is a variable corresponding to the length of the remaining part of the strip to be wound around the form during the second step, $\Omega$ is the angle of rotation of the form at the end of the first step, $L_0$ is the length of the neutral fiber of the strip, the speed $V_2$ of displacement of the rear edge mark during the second step is determined by the following equation:

$$V_2 = N^*[E_2 - (C^*L_0/360)/(360-\Omega-C-D)].$$

In this way, at the end of this second step, the remaining length of strip to be applied corresponds to the length of the neutral fiber of the strip referenced on the form, i.e. a length equal to $(C^*L_0/360)$, which makes it possible to eliminate the residual strain before the end of the application.

During a third step, the driving of the strip and the form is advantageously synchronized so as to eliminate the residual strain in the strip.

In order to eliminate effectively the residual strain in the strip during the third step, where:

N is a predetermined angular rotational speed of the form, $L_0$ is the length of the neutral fiber of the strip, The driving speed $V_3$ of the strip in the third step is determined by the following equation:

$$V_3 = N^* L_0/360$$

In order to check that the rear edge and front edge marks reach the desired predetermined positions at the end of the winding of the strip onto the form, at the end of the third step the position of the front edge and rear edge marks is determined and the angle of the sector which separates them is compared with a desired angle D.

The invention also relates to an installation for winding a strip of rubber onto a form of revolution, comprising:

a device for forming a strip of predetermined length, a device for applying a first mark, known as the front edge mark, to a first end of the strip, and a second mark, known as the rear edge mark, to a second end of the strip, a first device for driving the strip forward towards the form longitudinally, a gripping device capable of arranging the first end of the strip on the form, a second device for driving the form in order to wind the strip onto the form, characterized in that it furthermore comprises:

a synchronization device which, during a first step, synchronizes the first driving device and the second driving device such that the speeds of displacement of the rear edge mark and the front edge mark are substantially identical so as not to modify the length of the strip, a control device which, during a second step, controls the first driving device and the second driving device depending on the angular position of the form at the end of the first step and on the position of the rear edge mark such that the speeds of displacement of the rear edge mark and the front edge mark vary relative to each other so as to compensate the variations in length of the strip.

According to a preferred embodiment of the invention, the control device furthermore comprises a sensor for detecting the position of the front edge mark and a sensor for the angular position of the form.

According to a preferred embodiment of the invention, the control device furthermore comprises a sensor for the position in real time of the rear edge mark.

According to a preferred embodiment of the invention, the control device comprises a controller controlling the speed of the first and second driving devices depending on the data received from the detection sensor, from the angular position sensor, and from the sensor for the position in real time of the rear edge mark.

The sensor for the position in real time of the rear edge mark is advantageously arranged on the gripping device.

BRIEF DESCRIPTION OF THE DRAWINGS

The invention will be better understood upon reading the following description of the attached drawings, which are provided by way of examples and imply no limitation, in which.

DETAILED DESCRIPTION OF EMBODIMENTS OF THE INVENTION

Figure 1:
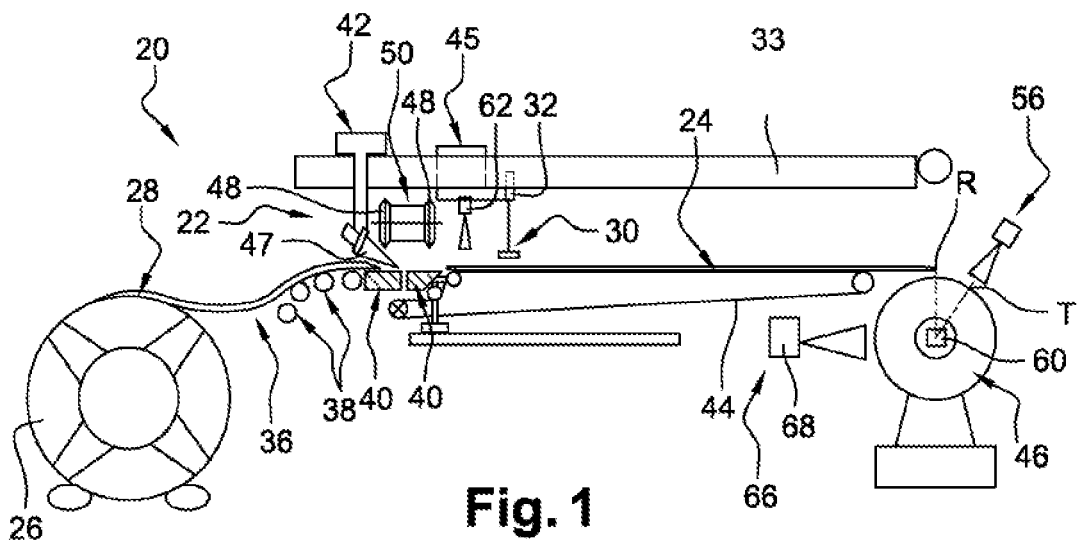
FIG. 1 is a side view of an installation for winding a strip of rubber according to a particular embodiment of the invention.

Shown in FIG. 1 is an installation 20 for winding a strip of rubber according to a particular embodiment of the invention.

This installation 20 comprises a device 22 for forming a strip of rubber 24 of a predetermined length.

The forming device 22 comprises a reel 26 from which a web 28 of rubber is unwound. The rubber of which the web 28 consists is, for example, chosen such that the strip of rubber 24 can be used as a tread to be applied to a tire blank.

The installation 20 furthermore comprises a gripping device 30 capable of taking hold of a downstream end $e_1$ of the web 28, which corresponds, as will be seen later, to the front edge of the strip of rubber 24 of predetermined length which it is desired to form.

This gripping device 30 comprises a transporter 32 which moves along a rail 33 and is equipped, for example, with suction pads 34 which perform the task of taking hold of the downstream end of the web 28. Other gripping means may, however, be considered, such as clamps, for example.

In order to unwind the reel 26, the transporter 32 takes hold of the downstream end $e_1$ of the web 28 and conveys it to a centering means 36 of the forming device 22 equipped with rollers 38 which guide the web 28 to vacuum tables 40 of a cutting system 42 which will be described below.

Figure 5:
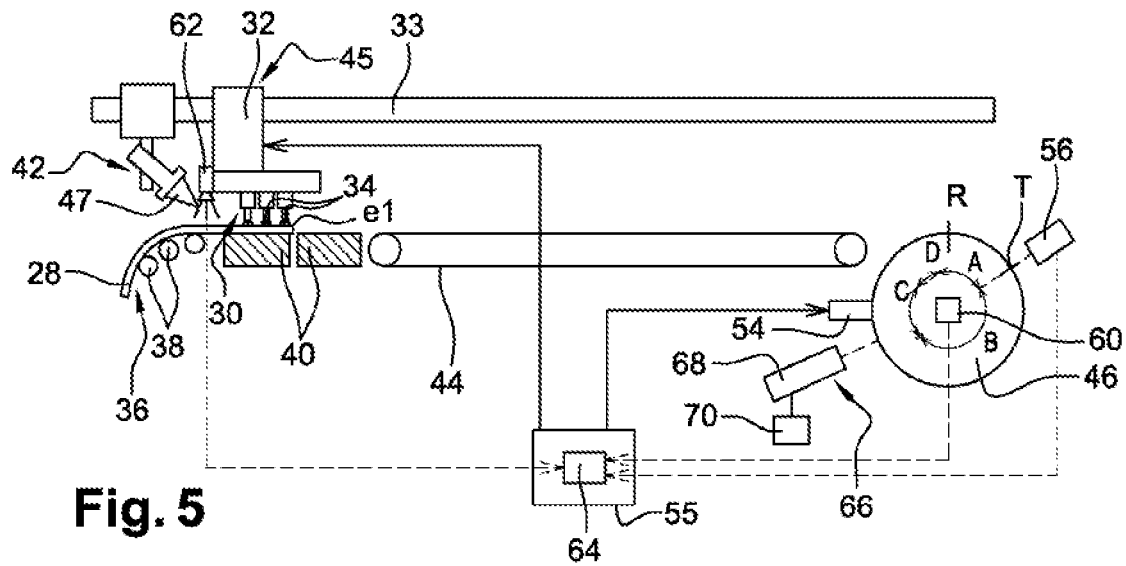
FIGS. 5 to 12 show the installation in FIG. 1 in different operating configurations.

At this stage of the method according to the invention, the installation 20 is in the configuration shown in FIG. 5.

The transporter 32 then continues to drive the downstream end $e_1$ to a belt 44 adjacent to the vacuum tables 40.

The belt 44 extends in a longitudinal direction and forms part, as does the transporter 32, of a first driving device 45 which drives the web 28 (from which the strip 24 will be formed) towards a form of revolution 46 onto which the strip 24 is intended to be wound.

The belt 44 and the transporter 32, which move at substantially the same speed, displace the web 28 towards the form 46 until the distance separating the downstream end $e_1$ of the web 28 and a blade 47 of the cutting system 42 is substantially equal to the desired (and hence predetermined) length $L_0$, of the strip 22 of rubber which it is desired to form.

Figure 2:
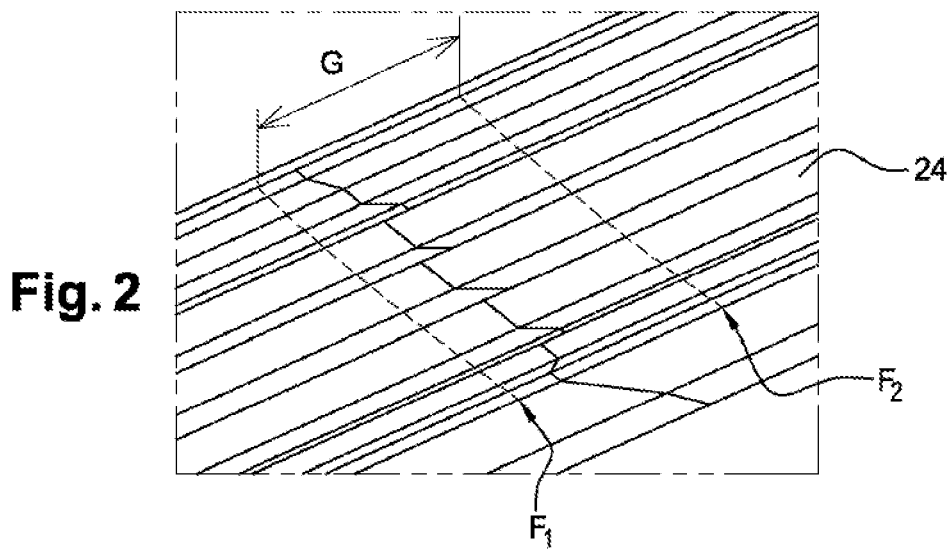
FIG. 2 is a perspective view of a strip of rubber after having been marked by the installation in FIG. 1.

This length $L_0$, which corresponds to the length of the neutral fiber of the future strip 24, is shown in FIG. 2.

The vacuum tables 40 are then activated to hold in position, by suction, that part of the web 28 situated beneath the blade 47 and thus to make a neat cut.

It will be noted that the blade 47 is arranged so as to be situated substantially at an equal distance from two marking rollers 48 of a mark-applying device 50.

Indeed, before the cut intended to form two successive strips from the web 28, an upstream strip 52 and a downstream strip 24 (see FIGS. 8 to 12), the mark-applying device 50 simultaneously marks, with the aid of the marking rollers 48, the upstream end $e_2$ of the future downstream strip 24 and the downstream end of the future upstream strip 52.

Figure 6:
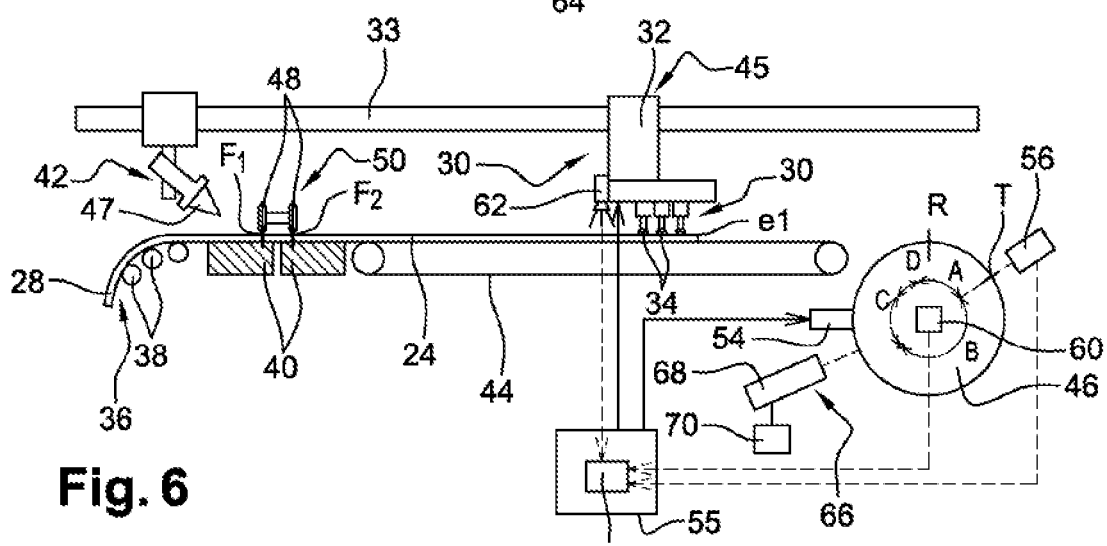

At this stage of the method according to the invention, the installation is in the configuration shown in FIG. 6.

The mark applied to the upstream end of the downstream strip 24 is termed the rear edge mark $F_2$ of the downstream strip 24 and the mark applied to the downstream end of the upstream end 52 is termed the front edge mark $F_1$ of the upstream strip.

By virtue of the cyclical character of the method of the invention, it will be understood that, in FIGS. 5 to 12, the strip 24 has been marked beforehand and its front edge, or its downstream end $e_1$, includes a front edge mark $F_1$.

The two marking rollers 48 are spaced apart by a constant distance G.

Consequently, as can be seen in FIG. 2 in which a portion of the web 28 after marking has been shown, the rear edge mark $F_2$ of the downstream strip 46 and the front edge mark $F_1$ of the upstream strip 44 are spaced apart by a distance G.

The distance G is chosen depending on the thickness of the rubber forming the web 28. The distance G is preferably the same for multiple ranges of thickness of rubber so that the installation 20 can be used to form the treads for various ranges of tires. In this case, the distance G chosen will be associated with the greatest thickness of rubber in the range. For the applications envisaged, the thickness of the web 28 is typically of the order of 3 to 4 cm.

Once the marking has been performed, the cutting system 42 is activated in order to cut the web 28 so that the cut line, shown in dashed lines in FIG. 2, is substantially always at the same distance from the front edge mark $F_1$ of the upstream strip 52, on the one hand, and from the rear edge mark $F_2$ of the downstream strip 24, on the other hand.

Figure 3:
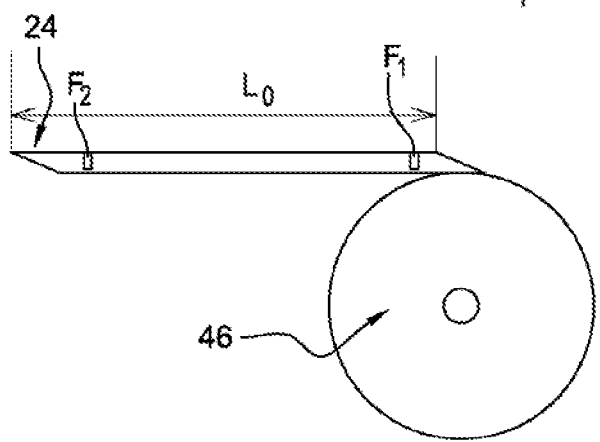
FIG. 3 is a diagram showing a strip of rubber and a form of revolution of an installation according to the invention.

Preferably, and as illustrated in FIG. 3, the cut is made diagonally so as to increase the contact surface area between the front and rear edges of the strip and thus to obtain a stronger weld at the end of the method. The length of the diagonally cut part is typically of the order of 10 cm for the applications envisaged.

Figure 7:
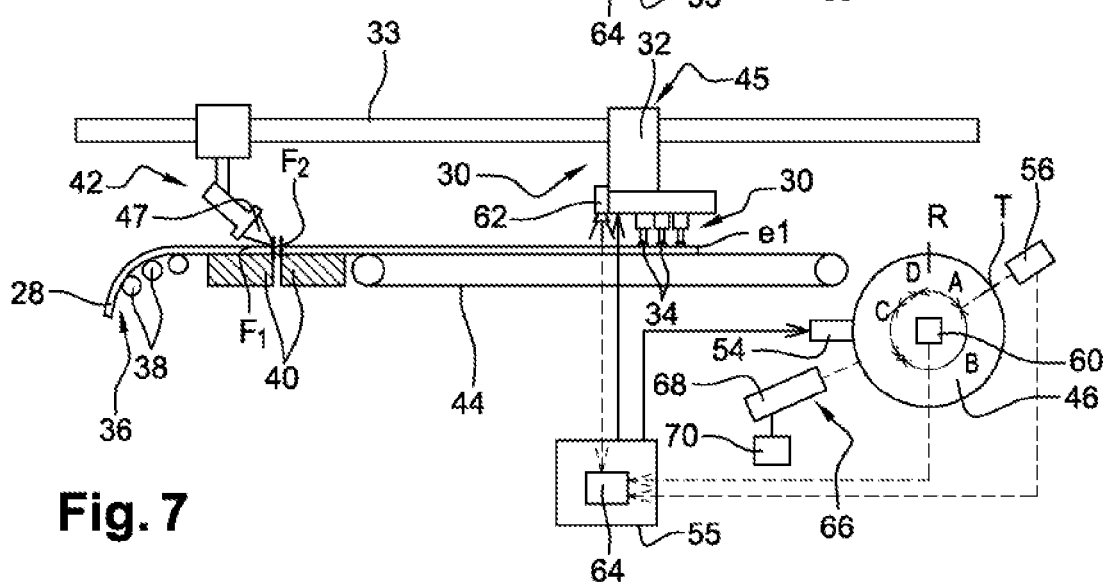

At this stage of the method according to the invention, the installation is in the configuration shown in FIG. 7.

After the cut, the belt 44 and the transporter 32, the suction pads 34 of which always hold the downstream end $e_1$, drive the strip 24 towards the form 46. The form 46 here has a circular cross-section.

The strip 24 is then arranged by the transporter 32 on a first predetermined position of the form, known as the reference position R.

Figure 8:
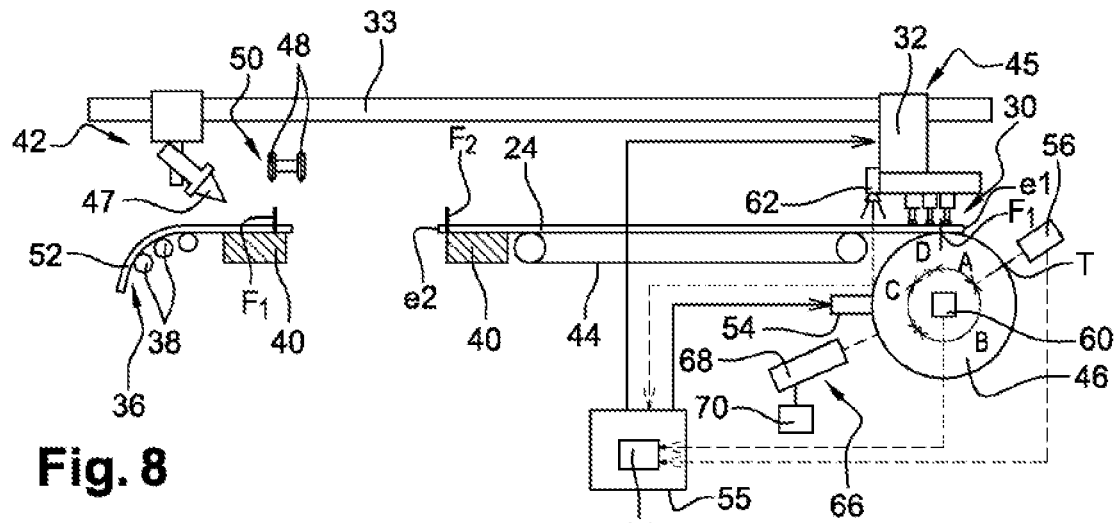

At this stage of the method according to the invention, the installation is in the configuration shown in FIG. 8.

Once the strip 24 has been deposited on the form 46, the transporter 32 lets go of the downstream end $e_1$ of the strip 24 and takes hold of the upstream end $e_2$ of the strip 24.

Figure 9:
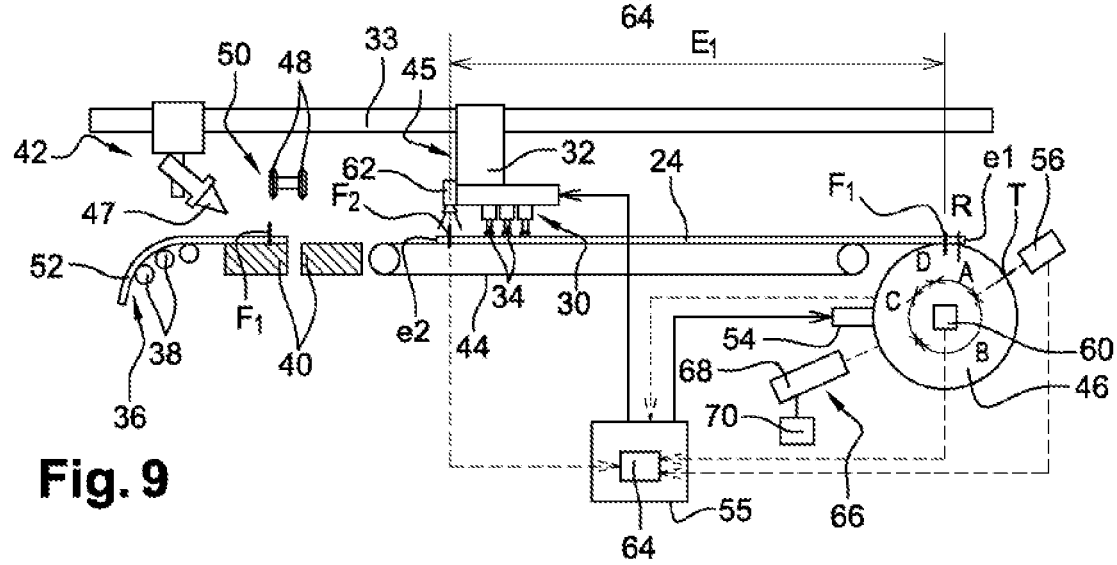

At this stage of the method according to the invention, the installation is in the configuration shown in FIG. 9.

The form 46 then starts to be driven with the aid of a second driving device 54 in order to wind the strip 24 onto the form 46.

During this first step, a synchronization device 55 synchronizes the first driving device 45 and the second driving device 54 such that the speeds of displacement of the rear edge mark $F_2$ and the front edge mark $F_1$ of the strip 24 are substantially identical.

In other words, the synchronization device 55 synchronizes the speed of advance of the belt 44 and the transporter 32 (which advance at the same speed), on the one hand, and the rotational speed of the form 46, on the other hand.

In this way, the length of the strip 24 is not modified during this first step.

More precisely, during the first step, where

N is a predetermined angular rotational speed of the form 46, $E_1$ is the length of the strip 24 between the rear edge $F_2$ and front edge $F_1$ marks, and D is the angle of the sector, extending between the rear edge mark $F_2$ and the front edge mark $F_1$, which it is desired to obtain once the whole strip 24 has been wound onto the form 46, the speed $V_1$ of displacement of the rear edge mark $F_2$, in other words the speed of advance of the belt 44 and the transporter 32 during the first step, is determined by the following equation:

$$V_1 = N * E_1 / (360 - D).$$

By way of example, the speed $V_1$ is of the order of 60 metres per minute for the application envisaged.

Figure 4:
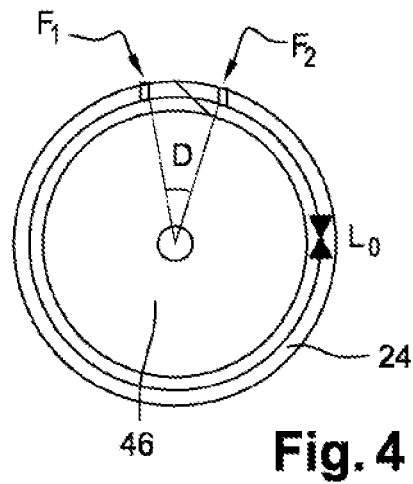
FIG. 4 is a diagram showing the strip of rubber in FIG. 3 wound onto the form of revolution.

The angle D is shown more particularly in FIG. 4. It is a constant dependent on the distance G between the marks and on the thickness of the web 28. Indeed, the angle D is the angle of the sector corresponding to the distance G referenced on the outer perimeter of the strip 24 once the latter has been placed on the form 46.

Figure 10:
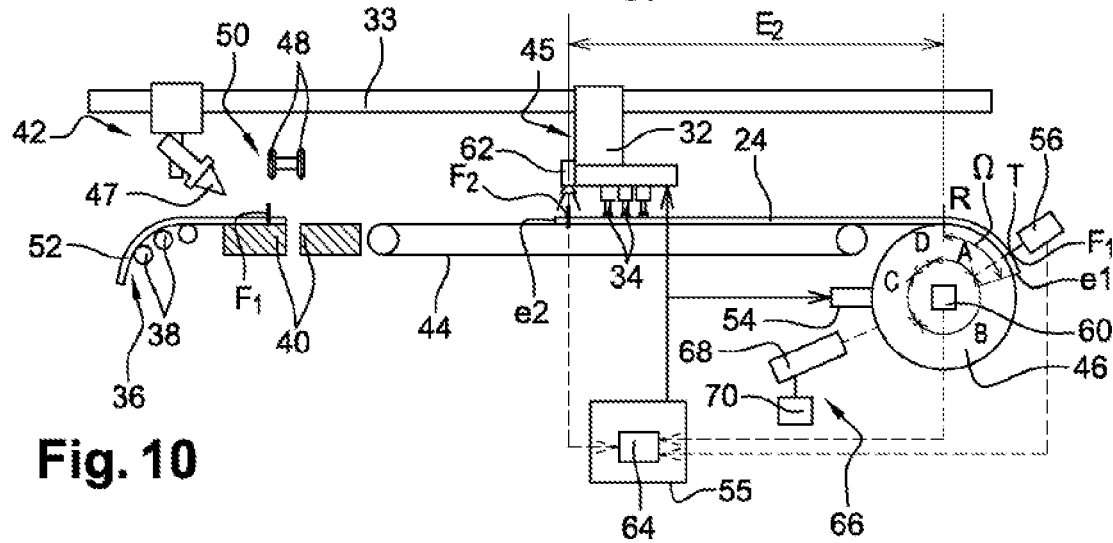

The end of the first step is determined by detecting the front edge mark $F_1$ at a second predetermined position on the form 46, known as the detection position T. The end of the first step is illustrated by FIG. 10.

The detection of the front edge mark $F_1$ at the detection position T is performed by a detection sensor 56 arranged on a fixed part (not shown) of the installation 20.

The detection position T and the reference position R are preferably separated on the form 46 by a predetermined angle A of between 10° and 90°. This angular range indeed makes it possible to ensure that the strip 24 does not become unstuck from the form 46 in the following step.

Once the detection position T has been reached by the front edge mark $F_1$, a control device 55 (which, in the embodiment of the invention presented here is conflated with the synchronization device 55) controls the first driving device 45 and the second driving device 54 during a second step depending on the angular position of the form 46 at the end of the first step and on the position of the rear edge mark $F_2$.

The angular position of the form 46 at the end of the first step corresponds to the angular position of the form 46 at the point in time when the rear edge mark $F_2$ is detected at the detection position T.

This parameter is used because this angular position, which is generally close to the angle A, differs slightly owing to the modification of the length of the strip 24 between when it is cut and when it is positioned on the form 46.

In most cases, it is observed that, as the strip 24 contracts after it has been cut, the angular position of the form 46 at the end of the first step is greater than the angle A by a few degrees because the form has had to be turned more than if the strip 24 had maintained its initial length $L_0$.

The angular position of the form 46 at the end of the first step is measured, for example, by means of an angular position sensor 60.

The angular position sensor 60 preferably measures the angle Ω of rotation of the form at the point in time when the detection sensor 56 detects that the front mark $F_1$ has reached the detection position T, this angle being measured relative to the reference position R.

The angular position of the form 46 is thus measured at one point in time.

On the other hand, the position of the rear edge mark $F_2$ is obtained in real time, i.e. as far as possible continuously, by virtue of a real-time position sensor 62 which is, for example, a camera mounted on the transporter 32.

The controlling in the second step is effected such that the speeds of displacement of the rear edge mark $F_2$ and the front edge mark $F_1$ vary relative to each other so as to compensate the variations in length of the strip 24. In most cases, as it is observed that the strip 24 contracts after it is cut, the strip 24 is stretched during the second step.

To this end, the control device 55 comprises a controller 64 which controls the speed of the first driving device 45 and the second driving device 54 depending on the data received from the detection sensors 56, the sensor 60 for the angular position of the form 46, and the real-time position sensor 62 for the rear edge mark $F_2$.

Figure 11:
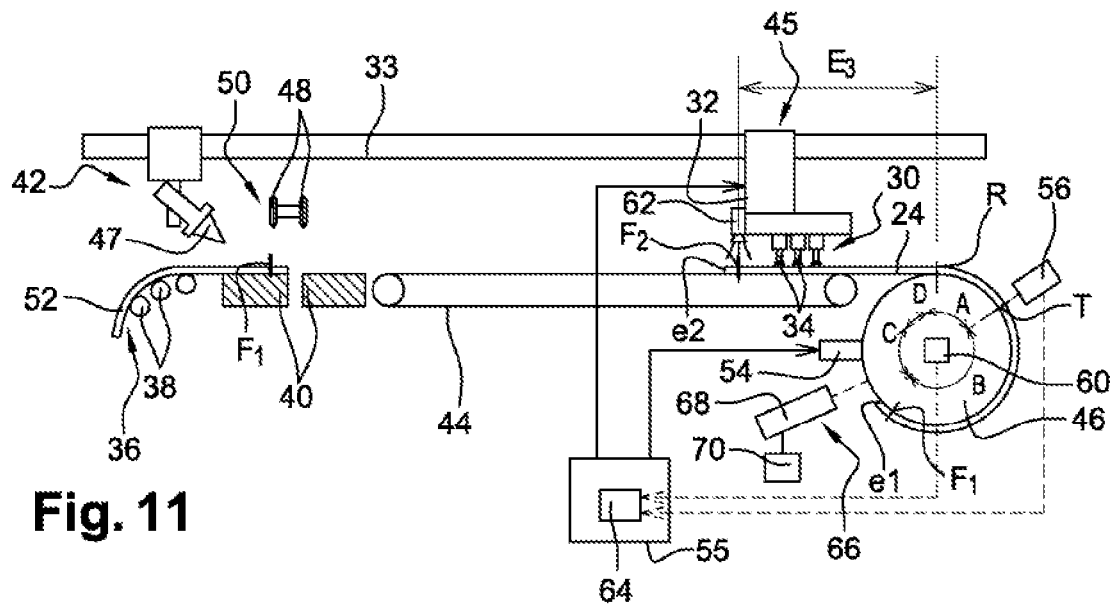

The second step ends, as illustrated in FIG. 11, at the point in time when the form 46 has traveled through a predetermined additional angular sector B and still needs to travel through a predetermined additional angular sector C before returning to the reference position R.

The angle B is preferably between 90° and 260°.

The choice of this angular range makes it possible to ensure that the sector corresponding to the performance of the second step is sufficiently large that the variation in length of the strip 24 can be corrected effectively.

More precisely, during the second step, where:
$E_2$ is a variable corresponding to the length of the part of the strip 24 remaining to be wound around the form 46 during the second step, the speed $V_2$ of displacement of the rear edge mark $F_2$ during the second step is determined by the following equation:

$$V_2 = N^*[E_2 - (C^*L_0/360)/(360 - \Omega - C - D)].$$

It will be noted that $E_2$ also corresponds to the length of the portion of the strip 24 between the rear edge mark $F_2$ and the reference position R, as illustrated in FIG. 10.

In this way, at the end of this second step, the remaining length of strip to be applied corresponds to the length of the neutral fiber referenced on the form, i.e. a length equal to $(C^*L_0/360)$, which makes it possible to eliminate the residual strain before the end of the application.

The calculation of the speed $V_2$ is, for example, performed by the controller 64 which sends a control signal corresponding to the first driving device 45 and the second driving device 54.

It will be noted that this same controller 64 is preferably responsible for calculating the speed $V_1$ and sending a control signal corresponding to the first and second driving devices 45, 54.

On completion of the second step, the length of the strip 24 has been corrected so as to ensure that, once the whole of the strip 24 has been wound onto the form 46, the front edge $F_1$ and the rear edge $F_2$ are situated in the desired positions before they are welded.

However, in order to eliminate the residual strain in the strip 24 caused by its elongation in the second step, a third step is provided during which the control device 55 synchronizes the speeds of the first driving device 45 and the second driving device 54 so as to eliminate the residual strain in the strip 24 before the end of the winding operation.

At the beginning of the third step, illustrated in FIG. 11, the form 46 still needs to travel through the angular sector C.

The angle C is preferably between 90° and 180°.

The choice of this angular range makes it possible to ensure that, at the end of the second step (at the beginning of the third), the sector corresponding to the length of the part of the strip 24 remaining to be wound around the form 46 is sufficiently large that the residual strain in the strip 24 can be eliminated before the end of the winding operation.

More precisely, during the third step, where,
$E_3$ corresponds to the length of the part of the strip 24 remaining to be wound around the form 46 during the third step, the speed $V_3$ at which the strip is driven in the third step is determined by the following equation:

$$V_3 = N^*E_3/C \text{ with } E_3 = C^*L_0/360$$

It will be noted that $E_3$ also corresponds to the length of the portion of the strip 24 between the rear edge mark $F_2$ and the reference position R, as illustrated in FIG. 11.

The calculation of the speed $V_3$ is, for example, performed by the controller 64 which sends a control signal corresponding to the first driving device 45 and the second driving device 54.

Figure 12:
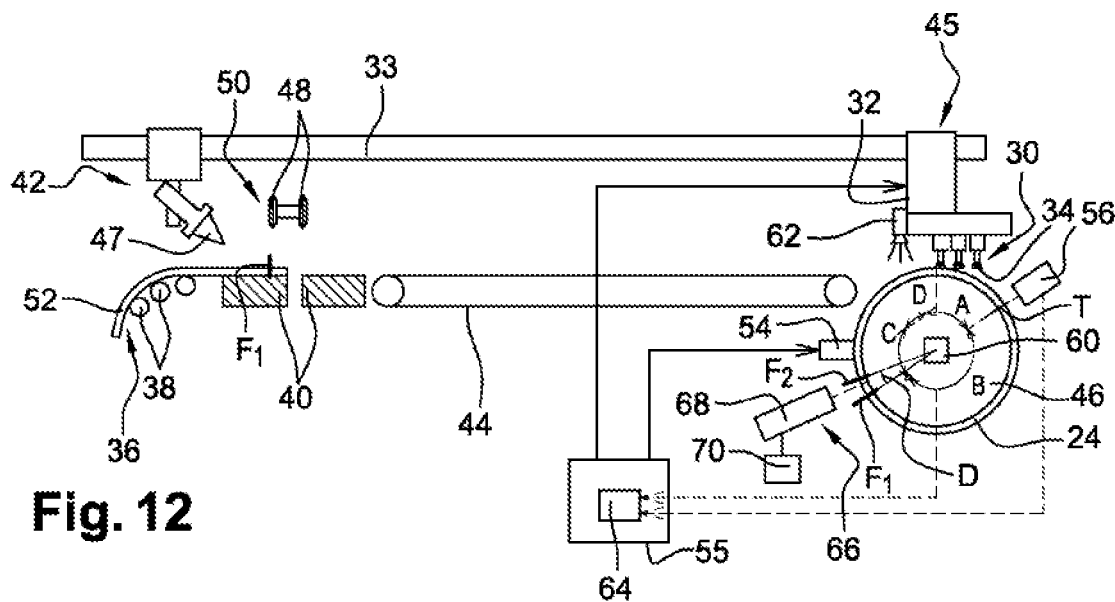

At the end of the third step, the whole of the strip 24 is wound around the form 46, as illustrated in FIG. 12.

In order to check that the front edge mark $F_1$ and rear edge mark $F_2$ have actually reached the desired positions before welding them (the device performing this step has not been shown), after the end of the third step the positions of the front edge mark $F_1$ and rear edge mark $F_2$ are determined and the angle of the sector separating them is compared with the desired angle D.

This checking step is performed, for example, by a checking device 66 equipped with a checking sensor 68 capable of detecting the position of the front edge mark $F_1$ and rear edge mark $F_2$ and measuring the angle of the sector which separates them, and with a comparator 70 capable of comparing the angle of the sector separating them with the desired angle D.

For example, in the embodiment shown in the Figures, the form is made to travel through an additional sector once the strip 24 has been wound in order to move the front edge mark $F_1$ and rear edge mark $F_2$ in front of the sensor 68.

Generally, the invention is not limited to the embodiments presented and other embodiments will be clear to a person skilled in the art.

It can, for example, be envisaged that a plurality of controllers perform the calculation of the speeds during the first, second and third steps instead of a single one, and/or to provide separate control devices for controlling the first and second driving devices during each of these steps. The synchronization and control devices can also be separate.

The invention claimed is:

1. A method for winding a strip of rubber onto a form of revolution, the method comprising:
   forming a strip of a predetermined length;
   placing a front edge mark on a front end of the strip, and placing a rear edge mark on a rear end of the strip;
   driving the strip longitudinally towards the form;
   arranging the front end of the strip on the form; and
   driving the form so as to wind the strip onto the form,
   wherein, in a first phase of the method, the driving of the strip and the driving of the form are synchronized such that a speed of displacement of the rear edge mark and a speed of displacement of the front edge mark are substantially identical, so as not to modify the length of the strip, and
   wherein, in a second phase of the method, the driving of the strip and the driving of the form are controlled depending on an angular position of the form at an end of the first phase and on a position of the rear edge mark such that the speed of displacement of the rear edge mark and the speed of displacement of the front edge mark vary relative to each other, so as to compensate for a variation in the length of the strip.

2. The method according to claim 1, wherein:
   the forming of the strip includes cutting a continuous web of rubber so as to form successive upstream and downstream strips, and
   an upstream end of the downstream strip and a downstream end of the upstream strip are marked simultaneously so that a mark applied to the upstream end of the downstream strip corresponds to a rear edge mark of the downstream strip, and so that a mark applied to the downstream end of the upstream strip corresponds to a front edge mark of the upstream strip.

3. The method according to claim 1,
   wherein, in the arranging of the front end of the strip, the front end of the strip is arranged at a predetermined reference position of the form, and
   wherein the end of the first phase is determined by detecting the front edge mark at a predetermined detection position on the form.

4. The method according to claim 3, wherein the predetermined detection position and the predetermined reference position are separated on the form by a predetermined angle A of between 10° and 90°.

5. The method according to claim 1,
   wherein the speed of displacement of the rear edge mark, $V_1$, during the first phase is determined by:

$$V_1 = N^* E_1/(360-D),$$

where:
   N is a predetermined angular rotational speed of the form,
   $E_1$ is the length of the strip between the rear edge mark and the front edge mark, and
   D is an angle of a sector of the form extending between the rear edge mark and the front edge mark, D being a desired angle when an entirety of the strip has been wound onto the form.

6. The method according to claim 1, wherein an end of the second phase corresponds to a point in time at which the form has traveled through an additional predetermined angular sector B and still needs to travel through an additional predetermined angular sector C before returning to a predetermined reference position.

7. The method according to claim 6, where an angle corresponding to the predetermined angular sector B is between 90° and 260°.

8. The method according to claim 7, wherein an angle corresponding to the predetermined angular sector C is between 90° and 180°.

9. The method according to claim 1,
   wherein the speed of displacement of the rear edge mark, $V_2$, during the second phase is determined by:

$$V_2 = N^*[E_2 - (C^* L_0/360)/(360-\Omega-C-D)],$$

where:
   N is a predetermined angular rotational speed of the form,
   $E_2$ is a variable corresponding to a length of a remaining part of the strip to be wound around the form during the second phase,
   $\Omega$ is an angle of rotation of the form at the end of the first phase,
   $L_0$ is a neutral fiber length of the strip, and
   D is an angle of a sector of the form extending between the rear edge mark and the front edge mark, D being a desired angle when an entirety of the strip has been wound onto the form.

10. The method according to claim 1, wherein, in a third phase of the method, the driving of the strip and the driving of the form are synchronized, so as to eliminate residual strain in the strip.

11. The method according to claim 1,
    wherein an end of the second phase corresponds to a point in time at which the form has traveled through an additional predetermined angular sector B and still needs to travel through an additional predetermined angular sector C before returning to the predetermined reference position, wherein, in a third phase of the method, the driving of the strip and the driving of the form are synchronized so as to eliminate residual strain in the strip, and wherein a driving speed of the strip, $V_3$, in the third phase is determined by:

$$V_3 = N * L_0 / 360,$$

where
- N is a predetermined angular rotational speed of the form, and
- $L_0$ is a neutral fiber length of the strip.

12. The method according to claim 10, wherein, at an end of the third phase, positions of the front edge mark and the rear edge mark are determined, and an angle of a sector separating the front edge mark and the rear edge mark is compared with the desired angle D.

* * * * *